US010637048B2

(12) United States Patent
Qi et al.

(10) Patent No.: US 10,637,048 B2
(45) Date of Patent: Apr. 28, 2020

(54) SILICON ANODE MATERIALS

(71) Applicant: GM GLOBAL TECHNOLOGY OPERATIONS LLC, Detroit, MI (US)

(72) Inventors: Gongshin Qi, Troy, MI (US); Wei Li, Troy, MI (US); Xingcheng Xiao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/992,347

(22) Filed: May 30, 2018

(65) Prior Publication Data

US 2019/0372108 A1 Dec. 5, 2019

(51) Int. Cl.
*H01M 4/36* (2006.01)
*H01M 4/587* (2010.01)
(Continued)

(52) U.S. Cl.
CPC ............. *H01M 4/366* (2013.01); *C01B 32/05* (2017.08); *C01B 33/025* (2013.01); (Continued)

(58) Field of Classification Search
CPC ............ H01M 4/36; H01M 4/38; H01M 4/62; H01M 4/587; C01B 33/025; C01B 32/05
See application file for complete search history.

(56) References Cited

U.S. PATENT DOCUMENTS 7,718,156 B2 5/2010 Zhang et al.
7,736,805 B2 6/2010 Nazri et al.
(Continued)

FOREIGN PATENT DOCUMENTS

CN 103779546 A 5/2014
CN 104269559 A 1/2015
(Continued)

OTHER PUBLICATIONS

Nian Liu et al., "A Yolk-Shell Dseign for Stabilized and Scalable Li-Ion Battery Alloy Anodes", *Nano Lett.* 2012, 12, 3315-3321; dx.doi.org/10.1021/nl3014814.
(Continued)

*Primary Examiner* — Kenneth J Douyette
(74) *Attorney, Agent, or Firm* — Harness, Dickey & Pierce, P.L.C.

(57) ABSTRACT

A silicon anode material for an electrochemical cell that cycles lithium and methods of formation relating thereto are provided. The silicon anode material comprises a plurality of carbon-encased silicon clusters, where each carbon-encased silicon cluster includes a volume of silicon nanoparticles encased in a carbon shell having an interior volume greater than the volume of the silicon nanoparticles. The method of making the silicon anode material includes forming a plurality of precursor clusters, where each precursor silicon-based cluster comprises a volume of $SiO_x$ nanoparticles ($x \leq 2$). The method further includes carbon coating each of the precursor clusters to form a plurality of carbon-coated $SiO_x$ clusters; and reducing the $SiO_x$ nanoparticles in each of the carbon-coated $SiO_x$ clusters to form the silicon anode material.

16 Claims, 3 Drawing Sheets

200 202 210 200 202 212 220 212 222

(51) Int. Cl.

| | |
|---|---|
| ***H01M 4/38*** | (2006.01) |
| ***H01M 4/62*** | (2006.01) |
| ***C01B 32/05*** | (2017.01) |
| ***H01M 10/0525*** | (2010.01) |
| ***C01B 33/025*** | (2006.01) |
| *H01M 4/02* | (2006.01) |

(52) U.S. Cl.

CPC ........... *H01M 4/386* (2013.01); *H01M 4/587* (2013.01); *H01M 4/62* (2013.01); *H01M 10/0525* (2013.01); *C01P 2004/50* (2013.01); *C01P 2004/62* (2013.01); *C01P 2004/64* (2013.01); *C01P 2004/80* (2013.01); *C01P 2006/10* (2013.01); *C01P 2006/12* (2013.01); *C01P 2006/40* (2013.01); *H01M 2004/021* (2013.01); *H01M 2004/027* (2013.01)

(56) References Cited

U.S. PATENT DOCUMENTS

| | | | | |
|---|---|---|---|---|
| 8,092,922 | B2 | 1/2012 | Lev et al. | |
| 8,101,152 | B1 | 1/2012 | Halalay et al. | |
| 8,399,138 | B2 | 3/2013 | Timmons | |
| 8,420,259 | B2 | 4/2013 | Xiao et al. | |
| 8,440,350 | B1 | 5/2013 | Verbrugge et al. | |
| 8,642,201 | B2 | 2/2014 | Cheng et al. | |
| 8,658,295 | B2 | 2/2014 | Cheng et al. | |
| 8,679,680 | B2 | 3/2014 | Vanimisetti et al. | |
| 8,828,481 | B2 | 9/2014 | Burton et al. | |
| 8,835,056 | B2 | 9/2014 | Xiao et al. | |
| 8,859,144 | B2 | 10/2014 | Xiao | |
| 8,999,584 | B2 | 4/2015 | Jiang et al. | |
| 9,005,811 | B2 | 4/2015 | Xiao et al. | |
| 9,012,075 | B2 | 4/2015 | Verbrugge et al. | |
| 9,034,519 | B2 | 5/2015 | Xiao et al. | |
| 9,059,451 | B2 | 6/2015 | Xiao et al. | |
| 9,093,705 | B2 | 7/2015 | Xiao et al. | |
| 9,142,830 | B2 | 9/2015 | Xiao et al. | |
| 9,153,353 | B2 | 10/2015 | Liu et al. | |
| 9,153,819 | B2 | 10/2015 | Huang et al. | |
| 9,302,914 | B2 | 4/2016 | Liu et al. | |
| 9,356,281 | B2 | 5/2016 | Verbrugge et al. | |
| 9,362,551 | B2 | 6/2016 | Sachdev et al. | |
| 9,362,552 | B2 | 6/2016 | Sohn et al. | |
| 9,379,374 | B2 | 6/2016 | Liu et al. | |
| 9,531,004 | B2 | 12/2016 | Xiao et al. | |
| 9,564,639 | B2 | 2/2017 | Huang | |
| 9,570,752 | B2 | 2/2017 | Huang et al. | |
| 9,577,251 | B2 | 2/2017 | Xiao et al. | |
| 9,583,767 | B2 | 2/2017 | Verbrugge et al. | |
| 9,780,361 | B2 | 10/2017 | Xiao et al. | |
| 9,859,554 | B2 | 1/2018 | Xiao et al. | |
| 10,062,898 | B2 | 8/2018 | Xiao | |
| 10,141,569 | B2 | 11/2018 | Verbrugge et al. | |
| 10,164,245 | B2 | 12/2018 | Huang | |
| 10,199,643 | B2 | 2/2019 | Zhou et al. | |
| 10,326,136 | B2 | 6/2019 | Xiao et al. | |
| 10,424,784 | B2 | 9/2019 | Yang et al. | |
| 2002/0009639 | A1 | 1/2002 | Miyake et al. | |
| 2006/0127773 | A1 | 6/2006 | Kawakami et al. | |
| 2008/0044735 | A1 | 2/2008 | Ryu et al. | |
| 2009/0087731 | A1 | 4/2009 | Fukui et al. | |
| 2009/0208780 | A1 | 8/2009 | Sun et al. | |
| 2010/0297502 | A1* | 11/2010 | Zhu | H01M 4/134 429/231.8 |
| 2011/0073804 | A1* | 3/2011 | Sotokawa | C01G 23/005 252/182.1 |
| 2012/0077087 | A1 | 3/2012 | Cho et al. | |
| 2012/0100403 | A1 | 4/2012 | Wang et al. | |
| 2012/0229096 | A1 | 9/2012 | Nazri | |
| 2012/0328927 | A1 | 12/2012 | Timmons et al. | |
| 2013/0099159 | A1 | 4/2013 | Halalay et al. | |
| 2013/0323595 | A1 | 12/2013 | Sohn et al. | |
| 2013/0330619 | A1 | 12/2013 | Archer et al. | |
| 2015/0162602 | A1 | 6/2015 | Dadheech et al. | |
| 2016/0172665 | A1 | 6/2016 | Zhou et al. | |
| 2016/0285090 | A1* | 9/2016 | Ozkan | H01M 4/02 |
| 2017/0098817 | A1 | 4/2017 | Yu et al. | |
| 2017/0117538 | A1* | 4/2017 | Bendimerad | H01M 4/366 |
| 2017/0141382 | A1 | 5/2017 | Dadheech et al. | |
| 2017/0271678 | A1 | 9/2017 | Yang et al. | |
| 2017/0338490 | A1 | 11/2017 | Xiao et al. | |
| 2017/0352878 | A1* | 12/2017 | Kajita | C01B 32/22 |
| 2018/0123124 | A1 | 5/2018 | Yang et al. | |
| 2018/0205114 | A1 | 7/2018 | Pauric et al. | |
| 2019/0372114 | A1 | 12/2019 | Yang et al. | |

FOREIGN PATENT DOCUMENTS

| | | | |
|---|---|---|---|
| CN | 108023066 | A | 5/2018 |
| DE | 102017124894 | A1 | 5/2018 |
| KR | 20140135422 | A | 11/2014 |
| WO | WO-2012064702 | A2 | 5/2012 |

OTHER PUBLICATIONS

Jang Wook Choi et al., "Promise and reality of post-lithium-ion batteries with high energy densities", *Nature Reviews Materials*, vol. 1. Mar. 31, 2016, Art. No. 16013, 16 pages, doi:10.1038/natrevmats.2016.13.

Xingcheng Xiao et al., "Regulated Breathing Effect of Silicon Negative Electrode for Dramatically Enhanced Performance of Li-Ion Battery", *Adv. Funct. Mater.* 2015, 25, 1426-1433, DOI: 10.1002/adfm.201403629.

Halalay, Ion C. et al., U.S. Appl. No. 16/160,799, filed Oct. 15, 2018 entitled "Method for Making Silicon-Containing Composite Electrodes for Lithium-Based Batteries," 47 pages.

Yang, Li et al., U.S. Appl. No. 16/539,647, filed Aug. 13, 2019 entitled, "Negative Electrode Including Silicon Nanoparticles Having a Carbon Coating Thereon," 49 pages.

Kobayashi, Naoya et al., "Silicon/soft-carbon nanohybrid material with low expansion for high capacity and long cycle life lithium-ion battery," Journal of Power Sources, 326 (2016), pp. 235-241.

Wang, Jiangwei et al., "Structural Evolution and Pulverization of Tin Nanoparticles during Lithiation-Delithiation Cycling," Journal of The Electrochemical Society, 161 (11), F3019-F3024 (2014).

Yokoyama, Takuya et al., "Preparation of Porous Silicone Resin Sheet with Phase Inversion in Parallel with Non Solvent Induced Phase Separation and Application to Hollow Particle Formation," Materials Sciences and Applications, 2014, 5, pp. 649-659 (2014), DOI: 10.4236/msa.2014.59067.

Jiang, Meng et al., U.S. Appl. No. 16/547,084, filed Aug. 21, 2019 entitled, "Multilayer Siloxane Coatings for Silicon Negative Electrode Materials for Lithium Ion Batteries," 46 pages.

* cited by examiner

SILICON ANODE MATERIALS

INTRODUCTION

This section provides background information related to the present disclosure which is not necessarily prior art.

The present disclosure relates to a silicon anode material for an electrochemical cell that cycles lithium and formation methods relating thereto. The silicon anode material comprises a plurality of carbon-encased silicon clusters, each carbon-encased silicon cluster comprising a volume of silicon nanoparticles encased in a carbon shell having an interior volume greater than the volume of the silicon nanoparticles.

By way of background, high-energy density, electrochemical cells, such as lithium-ion batteries can be used in a variety of consumer products and vehicles, such as Hybrid Electric Vehicles (HEVs) and Electric Vehicles (EVs). Typical lithium-ion and lithium-sulfur batteries include a first electrode, a second electrode, an electrolyte material, and a separator. One electrode serves as a positive electrode or cathode (on discharge) and another serves as a negative electrode or anode (on discharge). A stack of battery cells may be electrically connected to increase overall output. Conventional rechargeable lithium-ion batteries operate by reversibly passing lithium ions back and forth between the negative electrode and the positive electrode. A separator and an electrolyte are disposed between the negative and positive electrodes. The electrolyte is suitable for conducting lithium ions and may be in solid (e.g., solid state diffusion) or liquid form. Lithium ions move from a cathode (positive electrode) to an anode (negative electrode) during charging of the battery, and in the opposite direction when discharging the battery.

Contact of the anode and cathode materials with the electrolyte can create an electrical potential between the electrodes. When electron current is generated in an external circuit between the electrodes, the potential is sustained by electrochemical reactions within the cells of the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

Many different materials may be used to create components for a lithium-ion battery. For example, cathode materials for lithium batteries typically comprise an electroactive material which can be intercalated with lithium ions, such as lithium-transition metal oxides or mixed oxides of the spinel type, for example including spinel $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), or lithium iron phosphates. The electrolyte typically contains one or more lithium salts, which may be dissolved and ionized in a non-aqueous solvent. The negative electrode typically includes a lithium insertion material or an alloy host material. For example, typical electroactive materials for forming an anode include lithium-graphite intercalation compounds, lithium-silicon intercalation compounds, lithium-tin intercalation compounds, and lithium alloys.

Certain anode materials have particular advantages. While graphite compounds are most common, anode materials with high specific capacity (in comparison with conventional graphite) are of growing interest. For example, silicon has the highest known theoretical charge capacity for lithium, making it one of the most promising materials for rechargeable lithium-ion batteries. However, anode materials comprising silicon may suffer from significant drawbacks. For example, the large volume changes (e.g., volume expansion/contraction) of silicon-containing materials during lithium insertion/extraction (e.g., intercalation and deintercalation) can result in physical damage to the anode, including wrinkling, fracture, or cracking. Such volumetric expansion thus can lead to loss of electrical contact and electrode activity. This is especially true at the loading density levels required for commercial viability of silicon-containing electrodes. Further, a solid electrolyte interface (SEI) layer formation can form on the active material surface and cause continuous electrolyte consumption and lithium ion loss, which can cause irreversible capacity fading in a lithium-ion battery. The large volumetric expansion during intercalation/alloy of the anode comprising silicon can thus result in a decline of electrochemical cyclic performance, diminished Coulombic charge capacity (capacity fade), and extremely limited, poor cycle life.

Accordingly, it would be desirable to develop materials of use in high energy lithium-ion batteries, which overcome the current shortcomings that prevent widespread commercial use of electrode materials comprising silicon, especially in vehicle applications. For long term and effective use, anode materials containing silicon should be capable of minimal capacity fade and maximized charge capacity for long-term use in lithium-ion batteries.

SUMMARY

This section provides a general summary of the disclosure, and is not a comprehensive disclosure of its full scope or all of its features.

In various aspects, the present disclosure provides a method of making a silicon anode material for an electrochemical cell that cycles lithium. The method may include forming a plurality of precursor clusters and carbon coating each of the precursor clusters. Each precursor cluster may include a volume of $SiO_x$ nanoparticles (where $x \leq 2$) and carbon coating each of the precursor clusters may form a plurality of carbon-coated $SiO_x$ clusters. The method may further include reducing the $SiO_x$ nanoparticles in each of the carbon-coated $SiO_x$ clusters to form the silicon anode material, which includes a plurality of carbon-encased silicon clusters. Each carbon-encased silicon cluster may include a volume of silicon nanoparticles encased in a carbon shell. Each carbon shell may have an interior volume greater than the volume of the silicon nanoparticles contained therewith.

In one aspect, the volume of silicon nanoparticles in each carbon-encased silicon cluster may be less than the volume of $SiO_x$ nanoparticles in the precursor cluster from which the silicon nanoparticles are formed during the reducing.

In one aspect, forming the precursor clusters may include spray drying a solution comprising the $SiO_x$ nanoparticles and polyethylene glycol (PEG).

In one aspect, each $SiO_x$ nanoparticle may have a particle diameter ranging from about 10 nm to about 500 nm.

In one aspect, the precursor clusters may further include silicon nanoparticles.

In one aspect, a volume ratio between the silicon nanoparticles and the $SiO_x$ nanoparticles of each precursor cluster may range from about 0.5 to about 5.

In one aspect, each precursor cluster may include a volume of $SiO_x$ nanoparticles ranging from about 5% to about 75% and a volume of silicon nanoparticles ranging from about 25% to about 90%.

In one aspect, carbon coating each of the precursor clusters may include coating the precursor cluster with a slurry and heating the slurry coating to a temperature ranging from about 300° C. to about 800° C. for a time ranging from about 5 minutes to about 300 minutes. The slurry may include a carbon precursor and a solvent.

In one aspect, the carbon precursor may be select from the group consisting of: polyvinylpyrrolidone (PVP), carboxymethyl cellulose (CMC), styrene butadiene rubber (SBR), an alginate, and combinations thereof.

In one aspect, the solvent may be solvent is selected from the group consisting of: water, n-methyl-2-pyrrolidone (NMP), tetrahydrofuran (THF), and combinations thereof.

In one aspect, reducing the $SiO_x$ nanoparticles may include one of magnesium vapor reduction and dihydrogen reduction at a temperature ranging from about 650° C. to about 1000° C.

In one aspect, each silicon nanoparticle may have a particle diameter ranging from about 2 nm to about 200 nm.

In one aspect, each carbon-encased silicon cluster may include from about 5 wt % to about 25 wt % of the silicon nanoparticles and from about 75 wt % to about 95 wt % of the carbon shell.

In one aspect, each carbon shell has a thickness ranging from about 10 nm to about 500 nm and a surface area ranging from about 5 $m^2/g$ to about 500 $m^2/g$.

In various aspects, the present disclosure provides a method of making a silicon anode material for an electrochemical cell that cycles lithium. The method may include forming a plurality of precursor clusters and carbon coating each of the precursor clusters. The precursor clusters may each include a volume of $SiO_2$ nanoparticles and silicon nanoparticles. Carbon coating the precursor clusters may form a plurality of carbon coated-coated $SiO_2$-silicon clusters. The method may further include reducing the $SiO_2$ nanoparticles in each of the carbon-coated $SiO_2$-silicon clusters to form the silicon anode material. The silicon anode material may include a plurality of carbon-encased silicon clusters. Each carbon-encased silicon cluster may include a volume of silicon nanoparticles encased in a carbon shell. The carbon shell may have an interior volume greater than the volume of the silicon nanoparticles.

In one aspect, the volume of silicon nanoparticles in each carbon-encased silicon cluster may be less than the volume of $SiO_2$ nanoparticles and silicon nanoparticles in the precursor cluster from which the silicon nanoparticles are formed during the reducing. The volume ratio between the silicon nanoparticles and the $SiO_2$ nanoparticles within each precursor clusters may range from about 0.5 to about 5

In one aspect, forming the precursor clusters may include spray drying a solution comprising the $SiO_2$ nanoparticles and polyethylene glycol (PEG). Carbon coating each of the precursor clusters may include coating the precursor clusters with a slurry and heating the slurry coating at a temperature ranging from about 300° C. to about 800° C. for a time ranging from about 5 minutes to about 300 minutes. The slurry may include a carbon precursor selected from the group consisting of: polyvinylpyrrolidone (PVP), carboxymethyl cellulose (CMC), styrene butadiene rubber (SBR), an alginate, and combinations thereof and a solvent selected from the group consisting of: water, n-methyl-2-pyrrolidone (NMP), tetrahydrofuran (THF), and combinations thereof. Reducing the $SiO_2$ nanoparticles may include magnesium vapor reduction or dihydrogen reduction, at a temperature ranging from about 650° C. to about 1000° C.

In yet other aspects, the present disclosure provides a silicon anode material for an electrochemical cell that cycles lithium. The silicon anode material may include a plurality of carbon-encased silicon clusters. Each carbon-encased silicon cluster may include a carbon shell defining an interior volume and a plurality of silicon nanoparticles having a total volume less than the interior volume of the carbon shell.

In one aspect, the carbon shell may have a thickness ranging from about 1 nm to about 2 nm and a surface area ranging from about 5 $m^2/g$ to about 500 $m^2/g$.

In one aspect, the electrochemical cell may include an amount of the silicon anode material ranging from about 10 wt % to about 90 wt %; and the silicon anode material may have a packing density within the electrochemical cell ranging from about 5 vol. % to about 60 vol. %.

In one aspect, each carbon-encased silicon cluster may have a solid electrolyte interphase (SEI) coating.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
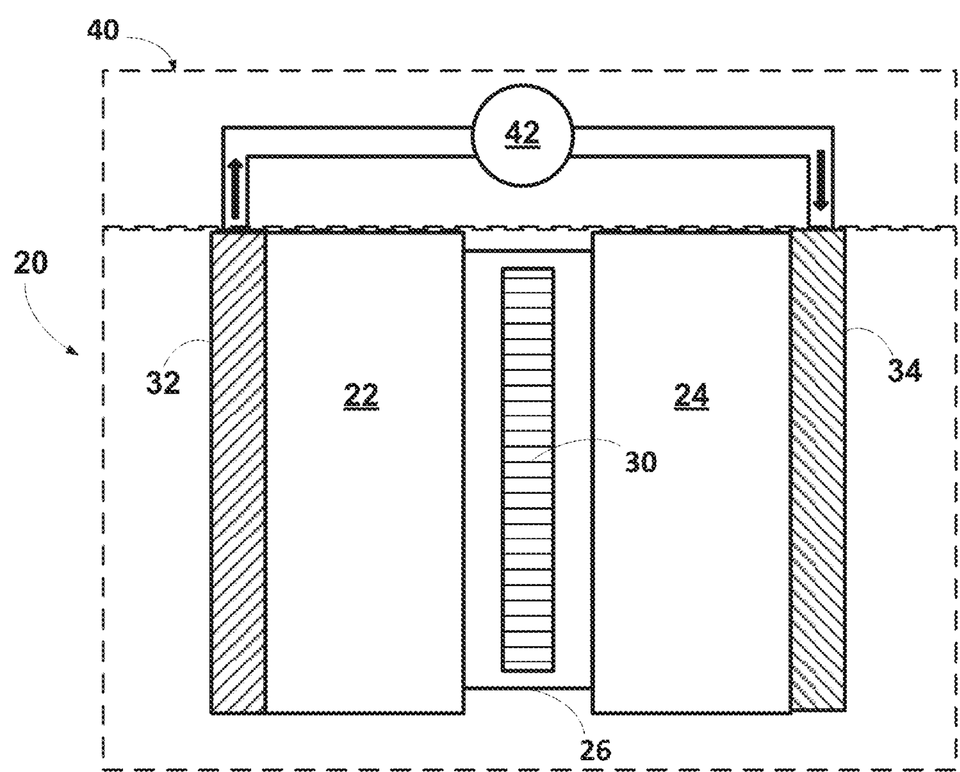
FIG. 1 is a schematic of an example electrochemical battery for purposes of illustration.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology contemplates a silicon anode material for an electrochemical cell that cycles lithium and methods of formation relating thereto. The silicon anode material comprises a plurality of carbon-encased silicon clusters, each carbon-encased silicon cluster includes a volume of silicon nanoparticles encased in a carbon shell having an interior volume greater than the volume of the silicon nanoparticles. A method of making the silicon anode material comprises forming a plurality of precursor clusters, each precursor silicon-based cluster comprising a volume of $SiO_x$, where $x \leq 2$; carbon coating each of the precursor clusters to form a plurality of carbon-coated $SiO_x$ clusters; and reducing the $SiO_x$ nanoparticles in each of the carbon-coated $SiO_x$ clusters to form the silicon anode material.

By way of background, an exemplary and schematic illustration of a battery 20 that cycles lithium ions is shown in FIG. 1. The battery 20 may be a lithium-ion electrochemical cell, a lithium-sulfur electrochemical cell, or a lithium-selenium battery, each including a negative electrode 22, a positive electrode 24, and a porous separator 26 disposed between the two electrodes 22, 24. The porous separator 26 includes an electrolyte system 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load device 42 connects the negative electrode 22 (through its current collector 32) and the positive electrode 24 (through its current collector 34).

The porous separator 26 operates as both an electrical insulator and a mechanical support, by being sandwiched between the negative electrode 22 and the positive electrode 24 to prevent physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the battery 20. In lithium-ion batteries, lithium intercalates and/or alloys in the electrode active materials. However, in a lithium-sulfur battery or a lithium-selenium battery, instead of intercalating or alloying, the lithium dissolves from the negative electrode and migrates to the positive electrode where it reacts/plates during discharge, while during charging, lithium plates on the negative electrode.

The battery 20 can be charged or re-energized at any time by connecting an external power source to the battery 20 to reverse the electrochemical reactions that occur during battery discharge. The connection of an external power source to the battery 20 compels the production of electrons and release of lithium ions from the positive electrode 24. The electrons, which flow back towards the negative electrode 22 through the external circuit 40, and the lithium ions, which are carried by the electrolyte system 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the battery 20 may vary depending on the size, construction, and particular end-use of the battery 20. Some notable and exemplary external power sources include, but are not limited to, an AC wall outlet and a motor vehicle alternator. In many lithium-ion battery configurations, lithium-sulfur and lithium-selenium battery configurations, each of the negative current collector 32, negative electrode 22, the separator 26, positive electrode 24, and positive electrode current collector 34 are prepared as relatively thin layers (for example, from several microns to a millimeter or less in thickness) and assembled in layers connected in electrical parallel arrangement to provide a suitable electrical energy and power package.

Furthermore, the battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances. The load device 42 may also be a power-generating apparatus that charges the battery 20 for purposes of storing energy. In certain other variations, the electrochemical cell may be a supercapacitor, such as a lithium-ion based supercapacitor.

With renewed reference to FIG. 1, the porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous membranes include CELGARD® 2500 (a monolayer polypropylene separator) and CELGARD® 2320 (a trilayer polypropylene/polyethylene/polypropylene separator) available from Celgard LLC.

When the porous separator 26 is a microporous polymeric separator, it may be a single layer or a multi-layer laminate, which may be fabricated from either a dry or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

In various aspects, the positive electrode 24, the negative electrode 22, and the separator 26 may each include an electrolyte solution or system 30, capable of conducting lithium ions between the negative electrode 22 and the positive electrode 24. The electrolyte system 30 may be a non-aqueous liquid electrolyte solution that includes one or more lithium salts dissolved in an organic solvent or a mixture of organic solvents. In certain variations, the electrolyte system 30 may be a 1M solution of one or more lithium salts in one or more organic solvents. Numerous conventional non-aqueous liquid electrolyte system 30 solutions may be employed in the lithium-ion battery 20.

A non-limiting list of lithium salts that may be dissolved in the one or more organic solvents to form the non-aqueous liquid electrolyte solution include lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium bis(oxalato)borate ($LiB(C_2O_4)_2$) (LiBOB); lithium difluorooxalatoborate ($LiBF_2(C_2O_4)$); lithium hexafluoroarsenate ($LiAsF_6$); lithium trifluoromethanesulfonate ($LiCF_3SO_3$); lithium trigluoromethanesulfonimide ($LiN(CF_3SO_2)_2$); lithium bis(fluorosulfonyl)imide ($LiN(FSO_2)_2$) (LiSFI); and combinations thereof.

These and other similar lithium salts may be dissolved in a variety of organic solvents, including but not limited to, various alkyl carbonates, such as cyclic carbonates (e.g., ethylene carbonate (EC), propylene carbonate (PC), butylene carbonate (BC), fluoroethylene carbonate (FEC)); linear carbonates (e.g., dimethyl carbonate (DMC), diethyl carbonate (DEC), ethylmethylcarbonate (EMC)); aliphatic carboxylic esters (e.g., methyl formate, methyl acetate, methyl propionate), γ-lactones (e.g., γ-butyrolactone, γ-valerolactone); chain structure ethers (e.g., 1,2-dimethoxyethane, 1-2-diethoxyethane, ethoxymethoxyethane); cyclic ethers (e.g., tetrahydrofuran, 2-methyltetrahydrofuran); and combinations thereof.

In various aspects, the positive electrode 24 may be formed from a lithium-based active material that can sufficiently undergo lithium intercalation and deintercalation, alloying and dealloying, or plating and stripping, while functioning as the positive terminal of the battery 20. The positive electrode 24 electroactive materials may include one or more transition metals, such as manganese (Mn), nickel (Ni), cobalt (Co), chromium (Cr), iron (Fe), vanadium (V), and combinations thereof. Two exemplary common classes of known electroactive materials that can be used to form the positive electrode 24 are lithium transition metal oxides with layered structure and lithium transition metal oxides with spinel phase.

For example, in certain instances, the positive electrode 24 may include a spinel-type transition metal oxide, like lithium manganese oxide ($Li_{(1+x)}Mn_{(2-x)}O_4$), where x is typically less than 0.15, including $LiMn_2O_4$ (LMO) and lithium manganese nickel oxide $LiMn_{1.5}Ni_{0.5}O_4$(LMNO). In other instances, the positive electrode 24 may include layered materials like lithium cobalt oxide ($LiCoO_2$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$, including $LiMn_{0.33}Ni_{0.33}Co_{0.33}O_2$, a lithium nickel cobalt metal oxide ($LiNi_{(1-x-y)}Co_xM_yO_2$), where $0<x<1$, $0<y<1$ and M may be Al, Mn, or the like. Other known lithium-transition metal compounds such as lithium iron phosphate ($LiFePO_4$) or lithium iron fluorophosphate ($Li_2FePO_4F$) can also be used. In certain aspects, the positive electrode 24 may include an electroactive material that includes manganese, such lithium manganese oxide ($Li_{(1+x)}Mn_{(2-x)}O_4$), a mixed lithium manganese nickel oxide ($LiMn_{(2-x)}Ni_xO_4$), where $0 \leq x \leq 1$, and/or a lithium manganese nickel cobalt oxide (e.g., $LiMn_{1/3}Ni_{1/3}Co_{1/3}O_2$). In a lithium-sulfur battery, positive electrodes may have elemental sulfur as the active material or a sulfur-containing active material.

In certain variations, the positive active materials may be intermingled with an optional electrically conductive material and at least one polymeric binder material to structurally fortify the lithium-based active material along with an optional electrically conductive particle distributed therein. For example, the active materials and optional conductive materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), lithium polyacrylate (LiPAA), sodium polyacrylate (NaPAA), sodium alginate, lithium alginate. Electrically conductive materials may include graphite, carbon-based materials, powdered nickel, metal particles, or a conductive polymer. Carbon-based materials may include by way of non-limiting example particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. As noted above, a positive electrode current collector 34 may be positioned at or near the positive electrode 24. The positive current collector 34 may be formed from aluminum (Al) or any other appropriate electrically conductive material known to those of skill in the art.

In various aspects, the negative electrode 22 includes an electroactive material as a lithium host material capable of functioning as a negative terminal of a lithium-ion battery. In certain aspects, the electroactive material of the negative electrode 22 comprises a silicon anode material. Thus, the negative electrode 22 may include the silicon anode material as the electroactive lithium host material and optionally another electrically conductive material, as well as one or more polymeric binder materials to structurally hold the lithium host material together. The negative electrode 22 may comprise greater than about 50% to less than about 100% of the electroactive material, optionally less than about 30% of an electrically conductive material, and a balance binder.

For example, in certain instances, the negative electrode 22 may include the electroactive material intermingled with a binder material selected from the group consisting of: polyvinylidene difluoride (PVDF), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, lithium alginate, polyimide, and combinations thereof. Suitable additional electrically conductive materials may include carbon-based material or a conductive polymer. Carbon-based materials may include for example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. As noted above, a negative electrode current collector 32 may be positioned at or near the negative electrode 22. The current collector 32 may comprise a metal selected from the group consisting of: copper, nickel, iron, titanium, and combinations thereof. The current collector may be formed of an iron alloy, such as stainless steel, by way of example.

Figure 2:
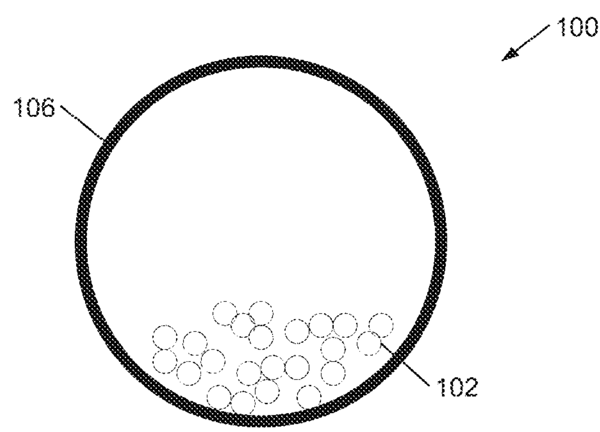
FIG. 2 is a sectional view of an example carbon-encased silicon clusters formed in accordance with certain aspects of the present disclosure.

As illustrated in FIG. 2, the silicon anode material may comprise a plurality of carbon-encased silicon clusters 100, each carbon-encased silicon cluster 100 includes a volume of silicon nanoparticles 102 encased in a carbon shell 106. The carbon shell 106 has an interior volume greater than the volume of the silicon nanoparticles 102. For example, the interior volume of the carbon shell 106 may range from about 0.5 $\mu m^3$ to about 500 $\mu m^3$, and in certain aspects, optionally from about 5 $\mu m^3$ to about 200 $\mu m^3$. The volume of the silicon nanoparticles 102 encased in the carbon shell 106 may range from about 0.1 $\mu m^3$ to about 100 $\mu m^3$, and in certain aspects, optionally from about 1 $\mu m^3$ to about 50 $\mu m^3$. Thus, each carbon-encased silicon cluster 100 may comprise from about 10 wt % to about 90 wt % of the silicon nanoparticles, and in certain aspects, optionally from about 5 wt % to about 25 wt % of the silicon nanoparticles. Each carbon-encased silicon cluster 100 may comprise from about 30 wt % to about 95 wt % of the carbon shell, and in certain aspects, optionally from about 75 wt % to about 95 wt % of the carbon shell.

In various aspects, the silicon nanoparticles 102 each have a particle diameter ranging from about 10 nm to about 500 nm. The carbon shell 106 may have a diameter ranging from about 100 nm to about 50 μm, and in certain aspects, optionally from about 500 nm to about 5,000 nm. The carbon shell 106 may have a thickness ranging from about 1 nm to about 500 nm, from about 1 nm to about 200 nm, from about 1 nm to about 100 nm, and in certain aspects, optionally from about 1 nm to about 2 nm. The carbon shell 106 may have a surface area ranging from about 5 $m^2/g$ to about 500 $m^2/g$. The carbon shell 106 may separate the silicon nanoparticles 102 from the electrolyte (e.g., 30). The silicon nanoparticles 102 may, however, still host the lithium of the electrochemical cell (e.g., 20).

The difference between the interior volume of the carbon shell 106 and the volume of the silicon nanoparticles 102 contained therewithin provides mechanical support to the negative electrode (e.g., 22) comprising the silicon anode material by accommodating the volume expansion of the silicon nanoparticles 102 during lithiation and/or delithiation. As such, the silicon anode material further allows for improved or increased loading and compact density of the silicon nanoparticles 102 within the negative electrode (e.g., 22). For example, the negative electrode (e.g., 22) may include an amount of silicon nanoparticles ranging from about 10 wt % to about 90 wt %, and in certain aspects, optionally from about 30 wt % to about 80 wt %. The silicon anode material may have a packing density within the negative electrode (e.g., 22) ranging from about 5 vol. % to about 60 vol. %, and in certain aspects, optionally from about 10 vol. % to about 30 vol. %. Moreover, the solid electrolyte interphase (SEI) layer, which aids the long-term cycling stability of the electrochemical cell (e.g., 20), forms on the carbon shell 106 has improved stability.

Figure 3:
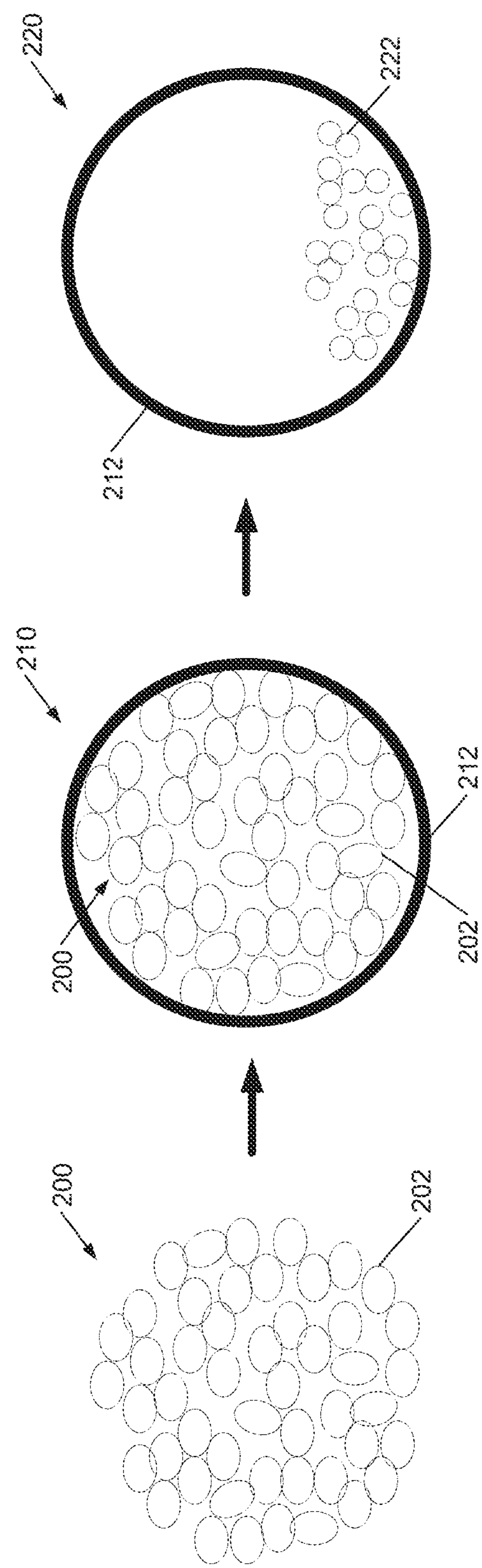
FIG. 3 is an explanatory illustration of an example method of formation of a silicon anode material in accordance with certain aspects of the present disclosure.

In various aspects, as illustrated in FIG. 3, the present disclosure provides a method of making the silicon anode material. The method includes first forming a plurality of precursor clusters, each precursor cluster 200 comprising a volume of $SiO_x$ nanoparticles, where $x \leq 2$. For example, in certain aspects, each precursor cluster 200 may comprise a volume of $SiO_2$ nanoparticles. The $SiO_x$ nanoparticles each have a particle diameter ranging from about 2 nm to about 200 nm. In certain aspects, forming the precursor cluster 200 may comprise spray drying a solution comprising the $SiO_x$ nanoparticles 202 and, for example, polyethylene glycol (PEG).

In certain aspects, each precursor cluster 200 may further comprise silicon nanoparticles. A volume ratio between the silicon nanoparticles and the $SiO_x$ nanoparticles of each precursor cluster may ranges from about 0.1 to about 5, from about 0.1 to about 1, and in certain aspects, optionally from about 0.5 to about 1. For example, in certain aspects, the volume ratio between the silicon nanoparticles and the $SiO_x$ nanoparticles of each precursor cluster may ranges from about 0.5 to about 5. More particularly, each precursor cluster may comprises a volume of $SiO_x$ nanoparticles, such as $SiO_2$ nanoparticles, ranging from about 5% to about 90%, and in certain aspects, optionally from about 5% to about 75%; and a volume of silicon nanoparticles ranging from about 5% to about 90%, and in certain aspects, optionally from about 25% to about 90%. In certain other aspects, each precursor cluster 200 may comprise oxide nanoparticles selected from the group consisting of: $SiO_x$(where $x \leq 2$), $Fe_2O_3$, $CeO_2$, CuO, NiO, ZnO, $K_2O$, $Na_2O$, MgO, $Al_2O_3$, $MnO_x$ (where $x \geq 1$), $CoO_x$(where $x \geq 1$), and combinations thereof.

Each formed precursor cluster 200 is carbon coated 212 to form a plurality of carbon-coated $SiO_x$ clusters 210. In certain aspects, carbon coating the precursor clusters 200 comprises (i) coating the precursor clusters with a slurry comprising a carbon precursor and a solvent; and (ii) heating the slurry coating to a temperature ranging from about 300° C. to about 800° C. for a time ranging from about 5 minutes to about 300 minutes pyrolyzing the carbon precursor. In various instances, the carbon precursor may be selected from the group consisting of: polyvinylpyrrolidone (PVP), carboxymethyl cellulose (CMC), an alginate, styrene butadiene rubber (SBR), and combinations thereof; and the solvent may be selected from the group consisting of: water, n-methyl-2-pyrrolidone (NMP), tetrahydrofuran (THF), and combinations thereof. For example, in certain aspects, the carbon precursor may comprise a combination of carboxymethyl cellulose (CMC) and styrene butadiene rubber (SBR). In still other aspects, the carbon precursor may comprise a combination of carboxymethyl cellulose (CMC) and sodium-alginate.

After formation of the carbon coating 212, the $SiO_x$ nanoparticles 202 in each of the carbon-coated $SiO_x$ clusters 210 are reduced to form the silicon anode material comprising the plurality of carbon-encased silicon clusters 220. Each carbon-encased silicon cluster 220 comprises a volume of silicon nanoparticles 222 encased in the carbon shell 212 having an interior volume greater than the volume of the silicon nanoparticles 222. The carbon-encased silicon clusters 220 are substantially free of $SiO_x$ nanoparticles, and as illustrated, the volume of silicon nanoparticles 222 in each carbon-encased silicon cluster 220 is less than the volume of $SiO_x$ nanoparticles 202 in the precursor cluster 200 from which the silicon nanoparticles 222 are formed during the reducing. For example, in certain aspects, the carbon-encased silicon clusters 220 include less than 5% of $SiO_x$ nanoparticles. In various aspects, reducing the $SiO_x$ nanoparticles may include the use of magnesium (Mg), hydrogen (e.g., $H_2$), and combinations thereof. For example, reducing the $SiO_x$ nanoparticles may include one of magnesium vapor reduction ($SiO_x+Mg \rightarrow Si+MgO$) and dihydrogen reduction (e.g., $H_2+SiO_x \rightarrow Si+H_2O$). Reducing the $SiO_x$ nanoparticles may occur at a temperature ranging from about 650° C. to about 1000° C.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a silicon anode material for an electrochemical cell that cycles lithium, the method comprising:

forming a plurality of precursor clusters, each precursor cluster comprising a volume of $SiO_x$ nanoparticles (where $x \leq 2$) and silicon nanoparticles, wherein for each precursor cluster a volume ratio between the silicon nanoparticles and the $SiO_x$ nanoparticles ranges from about 0.5 to about 5;

carbon coating each of the precursor clusters to form a plurality of carbon-coated $SiO_x$ clusters; and reducing the $SiO_x$ nanoparticles in each of the carbon-coated $SiO_x$ clusters to form the silicon anode material comprising a plurality of carbon-encased silicon clusters, each carbon-encased silicon cluster comprising a volume of silicon nanoparticles encased in a carbon shell having an interior volume greater than the volume of the silicon nanoparticles.

2. The method of claim 1, wherein the volume of silicon nanoparticles in each carbon-encased silicon cluster is less than the volume of $SiO_x$ nanoparticles in the precursor cluster from which the silicon nanoparticles are formed during the reducing.

3. The method of claim 1, wherein forming the precursor clusters comprises spray drying a solution comprising the $SiO_x$ nanoparticles and polyethylene glycol (PEG).

4. The method of claim 3, wherein each $SiO_x$ nanoparticle has a particle diameter ranging from about 10 nm to about 500 nm.

5. The method of claim 1, wherein each precursor cluster comprises a volume of $SiO_x$ nanoparticles ranging from about 5% to about 75% and a volume of silicon nanoparticles ranging from about 25% to about 90%.

6. The method of claim 1, wherein carbon coating each of the precursor clusters comprises:

coating the precursor cluster with a slurry comprising a carbon precursor and a solvent; and heating the slurry coating to a temperature ranging from about 300° C. to about 800° C. for a time ranging from about 5 minutes to about 300 minutes.

7. The method of claim 6, wherein the carbon precursor is select from the group consisting of: polyvinylpyrrolidone (PVP), carboxymethyl cellulose (CMC), styrene butadiene rubber (SBR), an alginate, and combinations thereof; and wherein the solvent is selected from the group consisting of: water, n-methyl-2-pyrrolidone (NMP), tetrahydrofuran (THF), and combinations thereof.

8. The method of claim 1, wherein reducing the $SiO_x$ nanoparticles comprises magnesium vapor reduction or dihydrogen reduction at a temperature ranging from about 650° C. to about 1000° C.

9. The method of claim 8, wherein each silicon nanoparticle has a particle diameter ranging from about 2 nm to about 200 nm.

10. The method of claim 1, wherein the carbon-encased silicon cluster comprises from about 5 wt % to about 25 wt % of the silicon nanoparticles and from about 75 wt % to about 95 wt % of the carbon shell.

11. The method of claim 1, wherein the carbon shell has a thickness ranging from about 10 nm to about 500 nm and a surface area ranging from about 5 $m^2/g$ to about 500 $m^2/g$.

12. The method of claim 1, wherein the silicon anode material is substantially free of the $SiO_x$ nanoparticles.

13. The method of claim 1, wherein the silicon anode material has a packing density within the electrochemical cell ranging from about 5 vol. % to about 60 vol. %.

14. A method of making a silicon anode material for an electrochemical cell that cycles lithium, the method comprising:

forming a plurality of precursor clusters comprising a volume of $SiO_2$ nanoparticles and silicon nanoparticles, wherein a volume ratio between the silicon nanoparticles and the $SiO_2$ nanoparticles within the precursor clusters ranges from about 0.5 to about 5;

carbon coating each of the precursor clusters to form a plurality of carbon coated-coated $SiO_2$-silicon clusters; and reducing the $SiO_2$ nanoparticles in each of the carbon-coated $SiO_2$-silicon clusters to form the silicon anode material comprising a plurality of carbon-encased silicon clusters, each carbon-encased silicon cluster comprising a volume of silicon nanoparticles encased in a carbon shell having an interior volume greater than the volume of silicon nanoparticles.

15. The method of claim 14, wherein the volume of silicon nanoparticles in each carbon-encased silicon cluster is less than the volume of $SiO_2$ nanoparticles and silicon nanoparticles in the precursor cluster from which the silicon nanoparticles are formed during the reducing.

16. The method of claim 14, wherein forming the precursor clusters comprises spray drying a solution comprising the $SiO_2$ nanoparticles and polyethylene glycol (PEG);

wherein carbon coating each of the precursor clusters comprises:

coating the precursor clusters with a slurry comprising a carbon precursor selected from the group consisting of: polyvinylpyrrolidone (PVP), carboxymethyl cellulose (CMC), styrene butadiene rubber (SBR), an alginate, and combinations thereof and a solvent selected from the group consisting of: water, n-methyl-2-pyrrolidone (NMP), tetrahydrofuran (THF), and combinations thereof; and heating the slurry coating at a temperature ranging from about 300° C. to about 800° C. for a time ranging from about 5 minutes to about 300 minutes; and wherein reducing the $SiO_2$ nanoparticles comprises magnesium vapor reduction or dihydrogen reduction at a temperature ranging from about 650° C. to about 1000° C.

* * * * *